United States Patent
Heisler et al.

(10) Patent No.: US 7,339,367 B2
(45) Date of Patent: Mar. 4, 2008

(54) INTERFACE FOR DETECTION AND CONTROL OF MULTIPLE TEST PROBES

(75) Inventors: Dion N. Heisler, Colorado Springs, CO (US); Nimal K. K. Gamage, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 116 days.

(21) Appl. No.: 11/413,990

(22) Filed: Apr. 28, 2006

(65) Prior Publication Data

US 2007/0252605 A1   Nov. 1, 2007

(51) Int. Cl.
*G01R 1/38* (2006.01)
(52) U.S. Cl. .................. 324/115; 324/72.5; 324/754
(58) Field of Classification Search ............. 324/115, 324/754–762
See application file for complete search history.

(56) References Cited

U.S. PATENT DOCUMENTS 5,162,725 A * 11/1992 Hodson et al. ............. 324/115
7,109,728 B2 * 9/2006 Crook et al. ............... 324/690

* cited by examiner

*Primary Examiner*—Ha Tran Nguyen
*Assistant Examiner*—Arleen M. Vazquez (57) ABSTRACT

An interface module. The interface module includes a probe identification module configured for connection to an identification bus, a probe detect module configured for connection to a detect-control bus, a power control module configured for connection to the detect-control bus, a control and data module configured for connection to a control-data bus, and multiple connectors. Each connector has an associated hot swap circuit. For each connector, if the probe detect module detects connection of that connector to a test probe via connection of that connector to the probe detect module, the probe identification module is configured to enable transfer of an identification label identifying that test probe to that test probe via that connector and the control and data module is configured to enable transfer of control instructions and data between the control-data bus and the test probe via connection of the control and data module to that connector.

11 Claims, 4 Drawing Sheets

INTERFACE FOR DETECTION AND CONTROL OF MULTIPLE TEST PROBES

BACKGROUND

Modern networks including communication networks such as those used to communicate with cellular phones perform valuable services in transmitting voice and data information over often extensive distances. The level of the quality of the service provided by such networks is of interest and of importance to the user, as well as to the provider, of those services. Mobile receivers and/or transmitters used to communicate with wireless networks can offer special challenges in obtaining and maintaining reliable connections. The quality of service for cellular phone networks in particular could be measured in terms of signal strength as measured at various locations, noise on the network, clarity of received voice communications, accuracy of data transmission, number of dropped calls in a given total number of calls in a specified local or under specified conditions among other items. The measurement of the quality of such networks can present special challenges due to the fact that these networks can extend over large areas and due to their wireless nature.

Techniques used to measure quality in cellular networks include controlling a cellular phone locally via its USB (Universal Serial Bus) or other standard port which is connected to a computer with the cell phone connected to the network using its conventional means. Network parameters are then measured using the computer which could be a laptop computer. From various locals and under various conditions, the computer could instruct the cellular phone to dial the phone number of another cellular phone that also has a computer connected to it. The operator could send data to the other cell phone/computer combination and may then receive data back. In other tests voice messages could be sent and received. In both cases, measurements could be made to compare the received signal to that originally transmitted. However, due to the general quality and reliability of consumer cellular phones the measurements may not be repeatable and may not provide reliable results.

In another technique, a radio module is controlled directly by a computer using the operating system of the user's computer not the operating system of the cell phone. While meaningful measurements can be made using this technique, it does not actually measure the experience which the customer would have. This technique does not have many of the problems of controlling the cell phone and using it as a test device, but it cannot actually emulate a cell phone.

SUMMARY

In representative embodiments, an interface module is disclosed. The interface module comprises a probe identification module configured for connection to an identification bus, a probe detect module configured for connection to a detect-control bus, a power control module configured for connection to the detect-control bus, a control and data module configured for connection to a control-data bus, and multiple connectors. Each connector has an associated hot swap circuit. For each connector, if the probe detect module detects connection of that connector to a test probe via connection of that connector to the probe detect module, the power control module is configured to enable connection of power to that test probe via that connector using its associated hot swap circuit, the probe identification module is configured to enable transfer of an identification label identifying that test probe to that test probe via that connector, and the control and data module is configured to enable transfer of control instructions and data between the control-data bus and the test probe via connection of the control and data module to that connector.

Other aspects and advantages of the representative embodiments presented herein will become apparent from the following detailed description, taken in conjunction with the accompanying drawings.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

As shown in the drawings for purposes of illustration, novel techniques are disclosed herein for a test system capable of measuring the quality of a network. The network could be a communications network such as a cellular telephone network. Test probes can be deployed at various remote locations throughout the network but controlled from a central control location. Each of the test probes emulate a network device such as a cell phone which can be used to detect and measure various parameters of the network. The tests that the test probes conduct are specified and controlled by a computer at the control location. The results of these measurements are transmitted to the computer at the control location for analysis of the state or quality of transmission of the network. Both data and voice transmissions can be measured and analyzed using a number of different parameters to characterize the quality of the network. The control computer communicates with the test probes over a control network either directly or via probe managers which are located with the test probes and which can manage multiple test probes via an interface module.

For wireless networks, the test probes can be located at preselected fixed locations. They can also be configured as mobile test probes capable of movement from place to place to map various parameters, such as signal strength. For example, a test probe could be mounted in a vehicle that can then be driven throughout a given service area of the network to continually measure the signal strength or other parameters of the network.

The test probes can be configured to communicate with networks and measure parameters of networks using a number of different technologies. A communication module designed and fabricated for use with the technology of a particular network, which could be a particular cell phone provider's network, can be inserted into the test probe enabling the test probe to then communicate with that provider's network and to emulate a device such as a cell phone that would normally be used to communicate with the network. That communication module can be replaced in the test probe as needed with a communication module designed and fabricated for use with the technology of another part of the provider's network or of another provider's network and which emulates a device such as a cell phone enabling the test probe to then communicate with that provider's network.

The test probes can run essentially unattended in various remote locations. They do not require continual on-site monitoring or attention by technical or other personnel. But, from time to time as needed, communication modules can be interchanged for probe upgrade and other reasons by service personnel.

In the following detailed description and in the several figures of the drawings, like elements are identified with like reference numerals.

Figure 1:
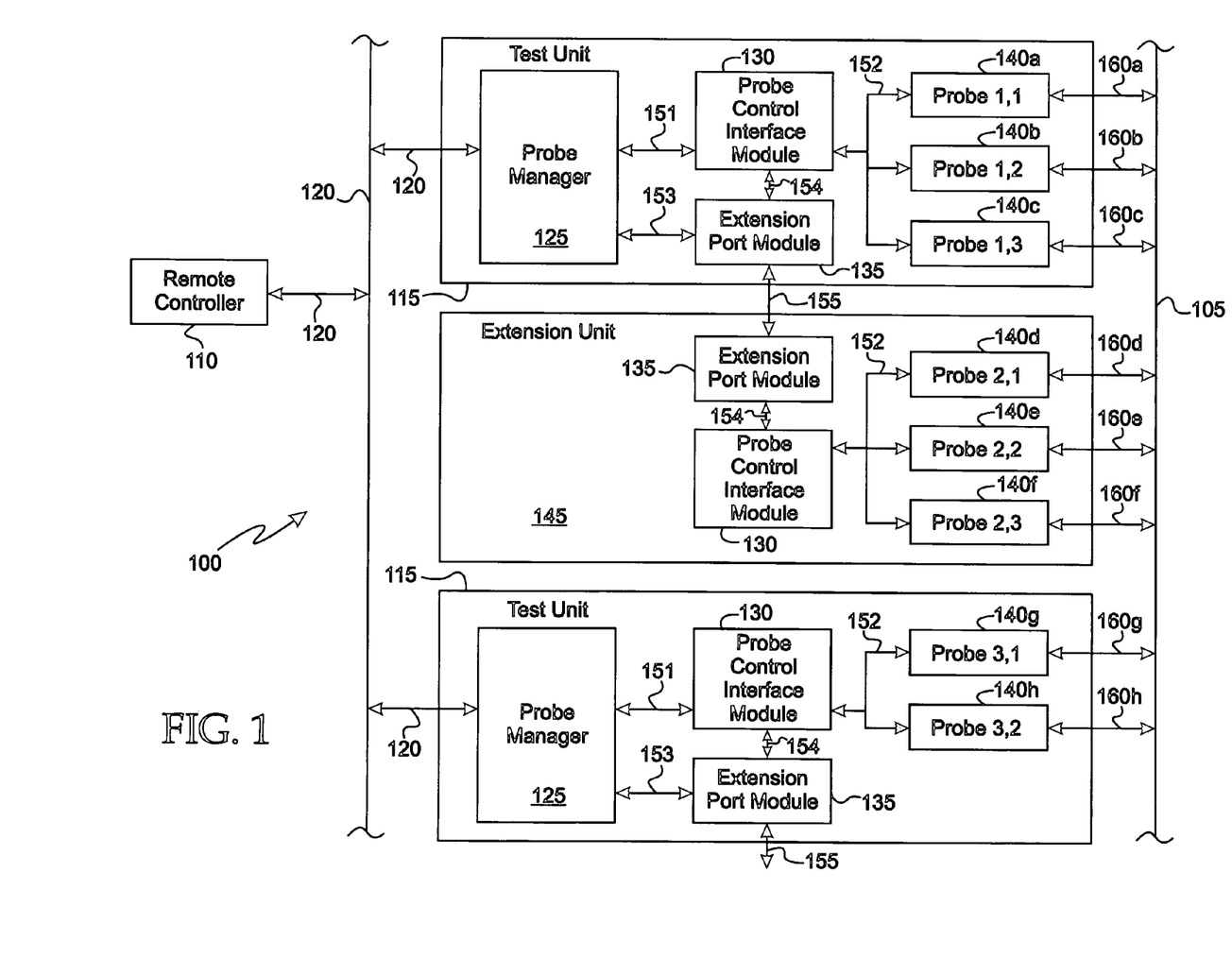
FIG. 1 is a block diagram of a test system for evaluating the condition of a communication network as described in various representative embodiments.

FIG. 1 is a block diagram of a test system 100 for evaluating the condition of a communication network 105 as described in various representative embodiments. The communication network 105 could be cellular phone network 105 or any other network 105. The test system 100 comprises a remote controller 110 connected to at least one test unit 115 via a data and control network 120. In FIG. 1, the remote controller 110 is shown connected to two test units 115 via the data and control network 120 over which data and control information flows between the remote controller 110 and the test units 115. Each of the test units 115 comprises a probe manager 125, a probe control interface module 130, also referred to herein as an interface module 130, an optional extension port module 135, and one or more probes 140. Probe 1,1 140a, probe 1,2 140b, probe 1,3 140c, probe 2,1 140d, probe 2,2 140e, probe 2,3 140f, probe 3,1 140g, probe 3,2 140h shown in FIG. 1 are collectively referred to as probes 140 which are also referred to herein as test probes 140 and could be test phones 140. The probe manager 125 communicates with the probe control interface module 130 via first test unit bus 151; the probe control interface module 130 communicates with the probes 140 located in the test unit 115 via second test unit bus 152; and the probes 140 located in the test unit 115 communicate with the communication network 105 via output signal path 160 shown as output signal paths 160a, 160b, 160c for the upper test unit 115 in FIG. 1 and as output signal paths 160g, 160h for the lower test unit 115 in FIG. 1. The probe manager 125 communicates with the optional extension port module 135 via third test unit bus 153, and the probe control interface module 130 communicates with the optional extension port module 135 via fourth test unit bus 154.

The extension port module 135 can be connected to an optional extension unit 145. In particular, as shown in the representative embodiment of FIG. 1, the extension port module 135 in the upper test unit 115 is connected to the extension port module 135 of the extension unit 145. The extension unit 145 comprises another extension port module 135, another probe control interface module 130, and zero or more probes 140. In the extension unit 145 of FIG. 1, the additional extension port module 135 is connected to the additional probe control interface module 130, and the additional probe control interface module 130 is connected to probe 2,1 140d, probe 2,2 140e, and probe 2,3 140f. The probes 140 located in the extension unit 145 are connected to the communication network 105 via output signal paths 160 shown as output signal paths 160d, 160e, 160f. The optional extension port module 135 located in the test unit 115 communicates with the extension port module 135 located in the extension unit 145 via fifth test unit bus 155; the additional extension port module 135 communicates with the additional probe control interface module 130 via a fourth test unit bus 154 located in the extension unit 145; and the additional probe control interface module 130 communicates with the test probes 140 located in the extension unit 145 via second test unit bus 152 located in the extension unit 145.

Figure 2:
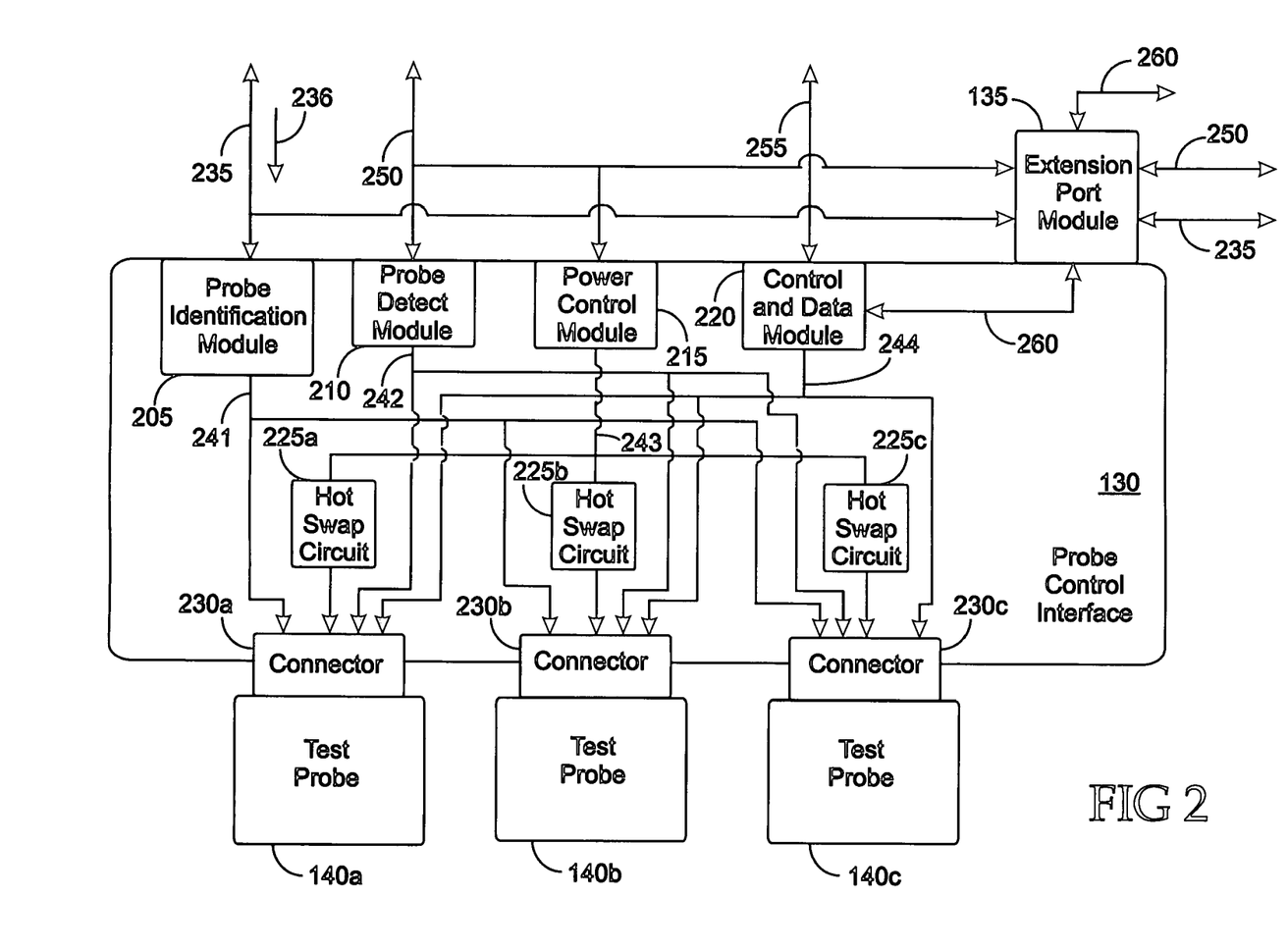
FIG. 2 is a block diagram of the probe control interface module of FIG. 1.

FIG. 2 is a block diagram of the probe control interface module 130 of FIG. 1. The probe control interface module 130 comprises a probe identification module 205 which could be a USB hub 205, a probe detect module 210, a power control module 215, a control and data module 220, optional multiple hot swap circuits 225a, 225b, 225c (collectively referred to as hot swap circuits 225), and multiple connectors 230a, 230b, 230c (collectively referred to as connectors 230). Also shown in FIG. 2, adjunct to the probe control interface module 130 is the extension port module 135. Each probe control interface module 130 acts as an interface between a particular probe manager 125 and various test probes 140 connected to that probe control interface module 130 and any test probes 140 connected to an extension unit 145 which might be connected to the extension port module 135 of its test unit 115. While the representative embodiment of FIG. 2 shows three test probes 140 connected to the probe control interface module 130, the actual number of test probes 140 in any given application is a design decision based on practical considerations of the application and is not limited to three. More or fewer connectors 230 can be provided, and all or fewer than all of the connectors 230 can have a test probe 140 plugged into them.

The probe identification module 205 can receive an identification label 236 which could be identification from a Subscriber Identification Module (SIM) or a mimic of a Subscriber Identification Module on an identification bus 235 which it then transfers to the test probes 140a, 140b via first interface bus 241 and connectors 230a, 230b. The SIM data identifies the particular test probe 140 (an emulated cellular phone) to the communication network 105. This identification may be generated by the probe manager 125 or remotely by the remote controller 110 and then transferred to the appropriate test probes 140 as just described.

The probe detect module 210 detects the presence of each test probe 140 plugged into each connector 230 of the probe control interface module 130. The presence or absence of each test probe 140 is detected via each connector 230 and such information is transferred over a second interface bus 242. This information is transferred by the probe detect module 210 to the probe manager 125 via detect and control bus 250. The detect and control bus 250 is also referred to herein as detect-control bus 250.

The power control module 215 controls the power applied to each test probe 140. The plugging into and removal from each connector 230 of a test probe 140 can be effected without manually removing the power by one of the hot swap circuits 225. Information regarding control of power to a given test probe 140 is transferred between the power control module 215 via third interface bus 243 and the hot swap circuit 225 associated with that test probe 140. Information between the power control module 215 and the probe manager 125 occurs via the detect and control bus 250.

The control and data module 220 transfers instructions from the probe manager 125 to the test probes 140. These instructions program the test probes 140 to run various tests and to return the results of those tests via a control and data bus 255, also referred to herein as control-data bus 255, to the probe manager 125 and subsequently to the remote controller 110. These instructions are transferred between the control and data module 220 and each of the test probes 140 via fourth interface bus 244 and the connector 230 associated with each test probe 140.

The extension port module 135 adjunct to the probe control interface module 130 connects to the identification bus 235 and the detect and control bus 250. The extension port module 135 further connects to the control and data module 220 via an extension control bus 260. The extension control bus 260 transfers instructions between the control and data module 220 and each of the test probes 140 in any extension unit 145 that might be attached via an extension port module 135 located with that extension unit 145. These instructions program the test probes 140 in the extension unit 145 to run various tests and to return the results of those tests via the extension control bus 260, extension port module 135, and the control and data bus 255 to the probe manager 125 and subsequently to the remote controller 110.

A first test unit bus 151 shown in FIG. 1 represents the identification bus 235, the detect and control bus 250, and the control and data bus 255; a second test unit bus 152 shown in FIG. 1 represents the first interface bus 241, the second interface bus 242, the third interface bus 243 (including hot swap circuits 225), and the fourth interface bus 244; a third test unit bus 153 shown in FIG. 1 represents the identification bus 235 and the detect and control bus 250; and a fourth test unit bus 154 shown in FIG. 1 represents the extension control bus 260; a fifth test unit bus 155 shown in FIG. 1 represents the identification bus 235, the detect and control bus 250, and the extension control bus 260.

The identification bus 235 could be a USB bus or other appropriate communication path. The control and data bus 255 and the extension control bus 260 could be 10/100 Ethernet buses.

Figure 3:
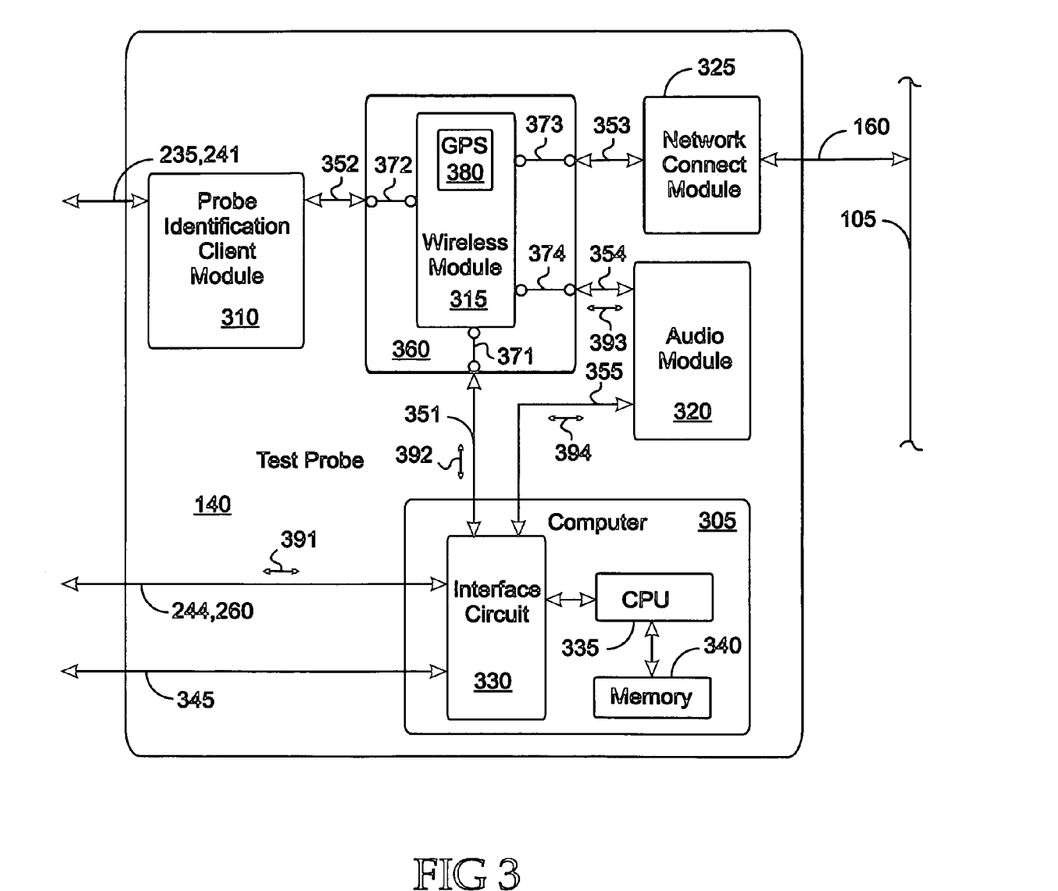
FIG. 3 is a block diagram of the test probe of FIG. 1.

FIG. 3 is a block diagram of the test probe 140 of FIG. 1. The test probe 140 comprises a computer 305, a probe identification client module 310 (also referred to herein as identification module 310), a wireless module 315, an audio module 320, and a network connect module 325 (also referred to herein as connect module 325). The computer 305 comprises an interface circuit 330 connected to a central processing unit (CPU) 335 which in turn is connected to a memory 340. The detect and control bus 250 shown in FIG. 2 extends via second interface bus 242 only as far as connectors 230. As such, neither the detect and control bus 250 nor the second interface bus 242 is shown in FIG. 3. Power to the various components is assumed but not explicitly shown in the figures.

If the test probe 140 is located in the test unit 115, SIM data can be received by the test probe 140 from the probe identification module 205 on the fourth interface bus 244. Or if the test probe 140 is located in the extension unit 145, SIM data can be received by the test probe 140 on the identification bus 235 via the extension port module 135 located in the extension unit 145 and the extension port module 135 located in the test unit 115.

If the test probe 140 is located in the test unit 115, instructions from the probe manager 125 can be received by the test probe 140 on the fourth interface bus 244 via the control and data module 220 and the control and data bus 255. Or if the test probe 140 is located in the extension unit 145, instructions from the probe manager 125 can be received by the test probe 140 on the extension control bus 260 via the extension port module 135 on the extension unit 145, the extension port module 135 on the test unit 115, and the control and data module 220 in the probe control interface module 130. Such communications are shown as test data 391 in FIG. 3 and are ultimately transferred to the remote controller 110.

A data bus 345 which could be a USB bus could be connected to the interface circuit 330 of the computer 305. The data bus 345 could be used as a data storage port to which a data storage device such as a hard drive, a floppy, a memory stick, a CD, a DVD, or other memory storage device could be connected to retrieve data from the computer 305. The data bus 345 could also be used to transfer other data out locally such as text messages, pictures from picture phones 140 and the like.

The computer 305 transfers instructions for controlling the wireless module 315 which includes rebooting the wireless module 315, running tests, and the like and receives resultant data from the wireless module 315 on first test probe bus 351 and then to the first interconnect bus 371. These communications transferred over the first test probe bus 351 and the first interconnect bus 371 are shown in FIG. 3 at digital data 392. Such instructions program the test probes 140 to run various tests and to return the results of those tests to the probe manager 125 and subsequently to the remote controller 110. Information such as graphical displays, pictures from picture phones, text messages, and the like can be transferred over the first test probe bus 351.

Modularity is provided the test probe 140 by interconnect module 360. Interconnect module 360 could be a printed circuit board 360 or similar component providing interconnecting conducting paths. The interconnect module 360 could be designed such that wireless modules 315 from a number of communication network providers can be plugged into the interconnect module 360 for testing their communication networks 105. In addition, if a particular network provider changes the service provided by or changes the technology of their communication network 105 or needs to test a new communication device such as a cellular phone, the current wireless module 315 can be easily replaced with a new wireless module 315 by simply unplugging the old wireless module 315 and plugging in the new wireless module 315.

SIM data is transferred between the Probe identification client module 310 and the wireless module 315 via second test probe bus 352 and second interconnect bus 372.

Radio frequency signals are transferred between the wireless module 315 and the network connect module 325 via a third interconnect bus 373 and the third test probe bus 353. The third test probe bus 353 could be coaxial cable 353; the network connect module 325 could be antenna 325; and the output signal path 160 could represent the radio frequency propagation path 160 between the antenna 325 of the test probe 140 and a nearby antenna of the communication network 105. Audio information carried by signals received and transmitted by the wireless module 315 is transferred between the wireless module 315 and the audio module 320. The audio module 320 could be a conventional audio card 320 which decodes/encodes the audio information from/into an audio signal. The transfer of the audio information between the wireless module 315 and the audio module 320 occurs over fourth interconnect bus 374 and fourth test probe bus 354. The audio information transferred over fourth interconnect bus 374 and fourth test probe bus 354 is shown in FIG. 3 as audio data 393.

The audio signal is transferred between the audio module 320 and the interface circuit 330 of the computer 305 on fifth test probe bus 355 where it may have been stored in memory 340 for later transmission by the wireless module 315 to the communication network 105, where it may be stored in the memory 340 for subsequent download and analysis by the remote controller 110, where it may be immediately downloaded to the remote controller 110, where if may be outputted on data bus 345, or where it may be otherwise appropriately disposed of. The audio information transferred over fifth test probe bus 355 is shown in FIG. 3 as audio signals 394.

In various representative embodiments, the interconnect module 360 can be designed to accept wireless modules 315 packaged in custom packages, standard PCMCIA (Personal Computer Memory Card International Association) type cards, and other appropriate packages. The particular package chosen is a matter of appropriateness, availability, and designer choice.

An optional global positioning system (GPS) receiver 380 is often integral with the wireless module 315 and is so shown in FIG. 3. The global positioning system receiver 380 includes an antenna capable of communicating with the satellites of the global positioning system and links within the wireless module 315 for accessing the positioning information. For ease of illustration, the antenna for the global positioning system receiver 380 and the links for accessing the positioning information are not shown in FIG. 3. The global positioning system receiver 380 can provide continuous positioning information which can be correlated with the test results obtained by the test probes 140. The global positioning system receiver 380 can otherwise be fabricated separate from the wireless module 315 and even separate from the test probe 140 but with positioning information that can be correlated with the test results obtained by the test probe 140.

Figure 4:
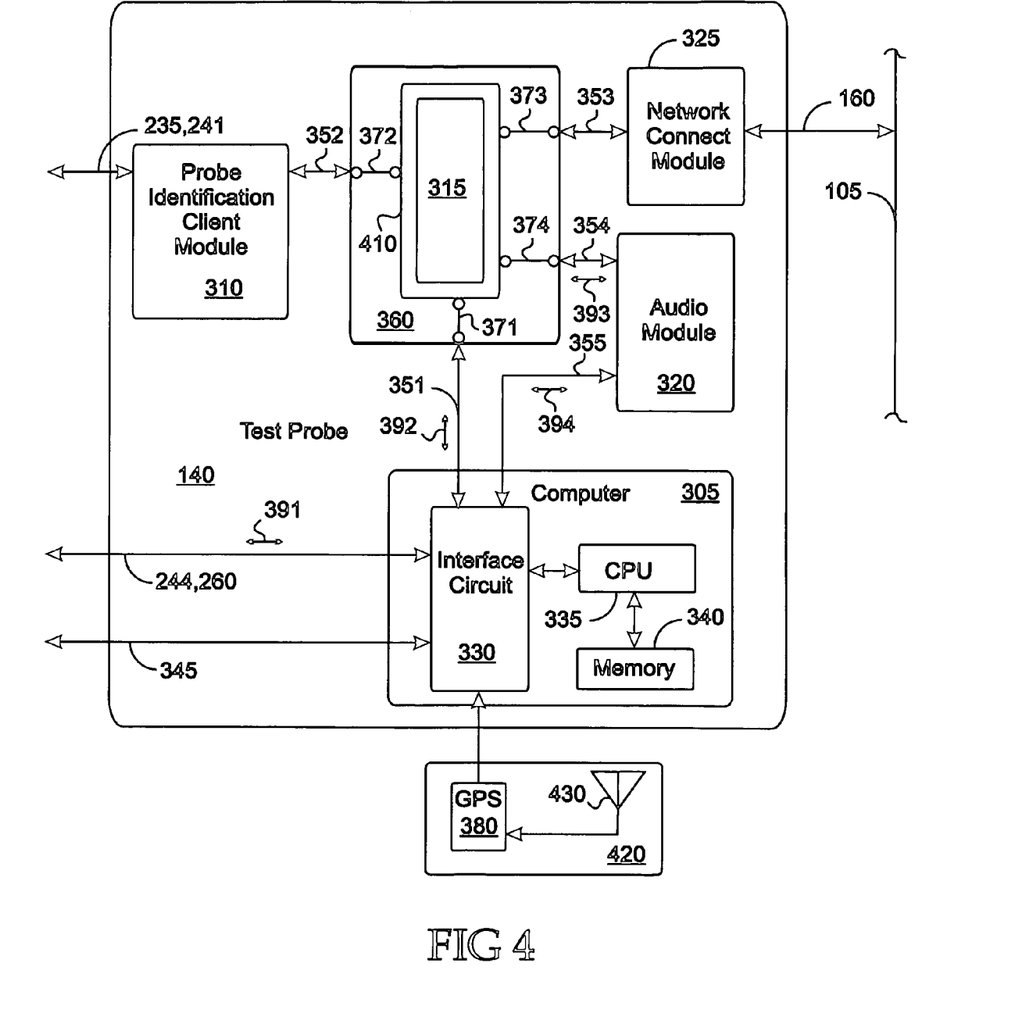
FIG. 4 is another block diagram of the test probe of FIG. 1.

FIG. 4 is another block diagram of the test probe 140 of FIG. 1. In FIG. 4, the test probe 140 comprises the computer 305, the probe identification client module 310, the wireless module 315, the audio module 320, and the network connect module 325. The computer 305 comprises the interface circuit 330 connected to central processing unit (CPU) 335 which in turn is connected to the memory 340. The detect and control bus 250 shown in FIG. 2 extends via second interface bus 242 only as far as connectors 230. As such, neither the detect and control bus 250 nor the second interface bus 242 is shown in FIG. 4. Power to the various components is assumed but not explicitly shown in the figures.

FIG. 4 further shows a receptacle 410 located on the interconnect module 360. The replaceable wireless module 315 plugs into the interconnect module 360, thereby making electrical contact with first, second, third, and fourth interconnect buses 371, 372, 373, 374. An optional global positioning system module 420 comprises the global positioning system receiver 380 and a global positioning system antenna 430. All or part of the global positioning system module 420 could be located internal to the test probe 140 or the global positioning system module 420 could be located external to the test probe 140 as shown in FIG. 4. The computer 305 can be configured to receive global position information outputted from the global positioning system receiver 380.

A bearer service is a type of technology used in a communication network 105 such as a cellular phone network 105. Different bearer services use different protocols such as Code Division Multiple Access (CDMA) which is a protocol for converting analog signals into digital form for transmission, Cellular Digital Packet Data (CDPD) which is a protocol for transmitting digital data over a cellular network, Short Message Service (SMS) which is a protocol for text messaging, and General Packet Radio Service (GPRS) which is a packet-linked technology that enables high-speed wireless internet and other data communications over a Global System for Mobile Communications (GSM) cellular system. The representative embodiments disclosed herein provide techniques for a communication network 105 provider to test each of the bearer services that the provider makes available.

In representative embodiments, the test probe 140 can emulate a cell phone or other device operable on a network 105. The test probe 140 can use the same services and operating system that a customer of the network provider would use in normal use. For example, the test probe 140 can be rebooted (turn power off and then back on), can send and receive text messages, can browse the web, can send and receive pictures as a picture cell phone would, can send and receive voice messages, and can send and receive other forms of data using protocols and normal connections to the communication network 105. In other words, the test probe 140 can perform functions and receive services just as a customer of the network 105 would. However, the actions of the test probe 140 can be initiated and controlled remotely. A number of unattended test units 115 with test probes 140 and with optional extension units 145 can be deployed to widely separated locations with the number being deployed at the discretion of the network provider. There can be a significant cost savings for the network provider in that the test units 115 do not require continuous on-site operate monitoring. The test units 115 with optional extension units 145 can be configured to have an appropriate number of test probes 140 as determined by the particular testing needs at any given location. With appropriate programming of the test probes 140 via the remote controller 110, the test system 100 can be set up to automatically inform the network provider of an imminent problem or one that has just occurred. The test probes 140 can accurately emulate a customer experience in using his or her cell phone.

Wireless modules 315 used by the network provider can often be obtained from the network provider and inserted into an appropriately configured interconnect module 360 to mimic the radio characteristics that are typically built into phones used on the communication network 105 of the network provider. The test probe 140 can be placed into any mode that might be available to a customer to test any bearer that the customer uses. Using the same operating system in the computer 305 and the same wireless module 315 as found in the customer's phone, provides a test probe 140 having functional characteristics that are essentially a replica of a customer's phone. Thus, the customer's experience in interacting with the network can be closely replicated.

The test probe 140 can be designed and fabricated such that it can be operated in a number of different environments. It can be designed to operate using a 12 volt DC source so that it can be operated from an automobile. It can have circuitry to protect its modules from damage and from operational abnormalities when the engine is started due to voltage surges that can occur. It can be designed to operate in extreme thermal environments as, for example, in the higher temperatures often found in an automobile. The test probe 140 can be designed to operate as a standalone device independent of the probe manager 125.

By mounting a test probe 140 in a vehicle, the vehicle can be used to map signal strength and the occurrence of dropped calls at various locations in a given service area. Simultaneously, the quality of the communication can be measured by continuously uploading and downloading a file. A global positioning system receiver 380 can also be installed in or installed with the test probe 140 so that the location of the test probe 140 can be correlated with the measurements.

Different cell phones can be emulated using a single wireless module 315. By sending appropriately coded strings, a test probe 140 can identify itself as one of a variety of different cell phones. The communication network 105 then labels the test probe 140 as a cell phone of the identified type. By so doing, the test probe 140 can control characteristics of the signal returned from a web page intended for display on the identified cell phone's display.

Test costs can be reduced as personnel are required at what may be a remote location only upon relatively rare occasions, for example, to replace a failed component, replace a module such as the wireless module 315 in order to emulate a different cell phone, or to add/remove test probes 140 to accommodate testing needs. The probe manager 125 can enable the recovery from periodic interruptions such as reboot. The remote controller 110 can remotely reset the test probes 140 placing them in a known state. A network provider can potentially have hundreds of test probes 140 deployed throughout a country, a continent, or even world wide. With remote management, the complexity and cost of managing numerous test probes 140 deployed over a large region can be significantly reduced.

The number of test probes 140 installed and used in a particular test unit 115 is dependent upon the network provider's testing needs, as is the number of test units 115 deployed at any given test site and the number and placement of those test sites. A localized phone system, for example, one belonging to a particular corporation, can be tested and analyzed separate from that of the communication system into which it connects external to its internal system.

The modularity of the test probes 140 enable the test probes 140 to be relatively easily adapted to changes in technology. A new bearer can be accommodated via a physical change of wireless modules 315 or a programming change. A given network provider can test different bearer technologies in different locales. The provider can move test units 115 and/or test probes 140 from one technology to another without replacement of the complete test probe 140 and without the associated high expense. The interconnect modules 360 can be designed to accept wireless modules 315 having standard form factors or packages such as PCMCIA cards, so that wireless modules 315 can be easily interchanged by unplugging the old one and inserting the new one. The interconnect modules 360 can be designed to accept one or more unique packages containing wireless modules 315.

Various tests can be easily programmed and run on the test system 100. For example, the tests can include determining how long it takes to hear a ring tone once the number of another cell phone is dialed, whether or not the calling cell phone hears the ring, and determining how long it takes to complete a call dialed from one test probe 140 to another test probe 140.

An individual test probe 140 can be controlled from the remote controller 110 by instructing the probe manager 125 to perform a certain action or actions on that test probe 140. These actions are performed on the test probe 140 via the probe control interface module 130. For example, the identification of the test probe 140 to the communication network 105 can be changed by changing the subscriber identification code transmitted to the test probe 140 on the identification bus 235, power can be removed from the test probe 140 in preparation for servicing of the test probe 140, an inactive test period, or a part of a reboot procedure, the presence of the test probe 140 can be detected, various instructions can be transmitted to the computer 305 in the test probe 140, and collected test data can be transmitted to the remote controller 110.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. An interface module, comprising:
    a probe identification module configured for connection to an identification bus;
    a probe detect module configured for connection to a detect-control bus;
    a power control module configured for connection to the detect-control bus;
    a control and data module configured for connection to a control-data bus; and
    multiple connectors, wherein each connector has an associated hot swap circuit and wherein for each connector, if the probe detect module detects connection of that connector to a test probe via connection of that connector to the probe detect module, the power control module is configured to enable connection of power to that test probe via that connector using its associated hot swap circuit, the probe identification module is configured to enable transfer of an identification label identifying that test probe to that test probe via that connector, and the control and data module is configured to enable transfer of control instructions and data between the control-data bus and the test probe via connection of the control and data module to that connector.

2. The interface module as recited in claim 1, wherein the interface module is configured such that each test probe connected to the interface module is configured to connect to and to test a network.

3. The interface module as recited in claim 1, wherein the interface module is configured such that each test probe connected to the interface module is configured to emulate a cellular phone.

4. The interface module as recited in claim 1, wherein the interface module is configured such that each test probe connected to the interface module is configured to emulate a cellular phone and to connect to and to test a communication network.

5. The interface module as recited in claim 1, wherein the identification label is obtained from or mimics information obtained from a subscriber identification module.

6. The interface module as recited in claim 1, further comprising:
    an extension port module, wherein the extension port module is configured for connection to the identification bus, wherein the extension port module is configured for connection to the detect-control bus, wherein the extension port module is connected to the control and data module via an extension control bus, and wherein the extension port module is configured for connection to an additional extension port module with pass-through of the configured connection of the extension port module to the identification bus, with pass-through of the configured connection of the extension port module to the detect-control bus, and with pass-through of the configured connection of the extension port module to the extension control bus.

7. The interface module as recited in claim 6, wherein the additional extension port module is located on an extension unit and wherein the extension unit comprises an additional interface module.

8. The interface module as recited in claim 7, wherein at least one test probe is connected to the additional interface module.

9. The interface module as recited in claim 8, wherein the additional interface module is configured such that each test probe connected to the additional interface module is configured to connect to and to test a network.

10. The interface module as recited in claim 8, wherein the additional interface module is configured such that each test probe connected to the additional interface module is configured to emulate a cellular phone.

11. The interface module as recited in claim 8, wherein the additional interface module is configured such that each test probe connected to the additional interface module is configured to emulate a cellular phone and to connect to and to test a communication network.

* * * * *